United States Patent [19]

Knight

[11] Patent Number: 4,459,465

[45] Date of Patent: Jul. 10, 1984

[54] THERMOSTATICALLY CONTROLLED ELECTRIC INSTANTANEOUS FLUID HEATER

[75] Inventor: Earl J. Knight, Greenville, S.C.

[73] Assignee: Demand Hot Water Inc., Charlotte, N.C.

[21] Appl. No.: 416,336

[22] Filed: Sep. 9, 1982

[51] Int. Cl.³ ............... H05B 1/02; H05B 3/78; F24H 1/10

[52] U.S. Cl. ............... 219/309; 219/306; 219/321; 219/330; 219/331; 219/486

[58] Field of Search ............... 219/296–299, 219/302, 305–309, 320, 321, 341, 330, 331, 328, 486, 487

[56] References Cited

U.S. PATENT DOCUMENTS

| | | | |
|---|---|---|---|
| 2,825,791 | 3/1958 | Jackson | 219/309 X |
| 2,848,588 | 8/1958 | Hackman | 219/486 |
| 3,261,963 | 7/1966 | Weinstein | 219/308 X |
| 3,353,000 | 11/1957 | Tomlinson | 219/486 X |
| 3,370,154 | 2/1968 | Fuchslocher | 219/309 |
| 3,531,622 | 9/1970 | Kaiser | 219/331 X |
| 3,586,822 | 6/1971 | Pastore | 219/486 X |
| 3,952,182 | 4/1976 | Flanders | 219/309 |

*Primary Examiner*—A. Bartis
*Attorney, Agent, or Firm*—W. Thad Adams, III

[57] ABSTRACT

An instantaneous fluid heater having a combined safety shut-off and temperature regulator includes a hollow heater block having a fluid inlet, a fluid outlet and inner walls defining a plurality of interconnected heating chambers forming a serpentine fluid flow path from the inlet to the outlet. A separate electric heating element is positioned in each chamber and a separate thermostat is positioned at the downstream end of each chamber for opening and closing an electrical circuit in response to the temperature at the downstream end. An electrical sequence switching arrangement cooperates with the thermostats to sequentially energize the heating elements, beginning with the heating element in the most downstream chamber. The thermostats are arranged in circuit with the heating elements and sequence switching arrangement to deenergize the heating element in the respective chamber with which the thermostat is positioned upon attainment of a pre-determined temperature at the downstream end of the chamber and for deenergizing the heating element in each chamber upstream therefrom without regard to whether or not the thermostat associated with each upstream chamber is open or closed. The fluid heater includes a flow switch for allowing operation only in response to a minimum fluid flow rate. A safety thermostat is provided at the downstream end of the most downstream chamber to establish a maximum permitted fluid temperature.

9 Claims, 2 Drawing Figures

THERMOSTATICALLY CONTROLLED ELECTRIC INSTANTANEOUS FLUID HEATER

TECHNICAL FIELD AND BACKGROUND OF THE INVENTION

This invention relates to an instantaneous water heater of the general type in which a fluid, usually water, is heated as it flows through a serpentine flow path and comes into contact with electric resistance heating elements. The particular disclosure of this application is of an instantaneous water heater with a redundant safety shut-off system responsive to either loss of fluid flow or excessive fluid temperature.

As the cost of fuel increases, it is becoming more economical to replace reservoir-type water heaters with instantaneous or "demand" water heaters which do not require storage of heated water for extended periods of time when not needed, and which heat water at the same rate as it is used so that no recovery time is required. Numerous types of instantaneous water heaters are known in the prior art and have been used in other parts of the world for many years. However, the relatively inexpensive cost of energy in the United States, combined with fears concerning the safety and reliability of instantaneous water heaters, has prevented this type of device from supplanting to any measurable degree older, reservoir water heaters.

For example, the Weinstein Pat. No. 3,261,963 discloses an automatic electric fluid heating apparatus which contains a plurality of resistance heating elements controlled in a pre-determined sequence by a motor-operated sequence switch with a built-in clutch control and a plurality of electro-mechanical relays. A reversible alternating current motor operates through a clutch to turn a shaft and a plurality of cams mounted thereon which engage and disengage contacts which in turn switch heating elements on and off. A fluid flow switch overrides the entire system when sufficient fluid is not being furnished to the heater. Weinstein and other patents, such as the Kaiser Pat. No. 3,531,622; Fuchslocher Pat. No. 3,370,154; and Flanders No. 3,952,182, all disclose instantaneous water heaters which, to the knowledge of applicant, have not achieved any degree of commercial success due to their complexity.

SUMMARY OF THE INVENTION

Therefore, it is an object of the invention to provide an improved instantaneous water heater having a simple and reliable shut-off and safety mechanism.

It is another object of the present invention to provide an instantaneous water heater having a plurality of thermostat controls for selectively switching on and off pre-determined heating elements in such a way as to provide accurate temperature control of outgoing water.

It is yet another object of the present invention to provide an instantaneous water heater which has a plurality of thermostat-controlled heating elements, with an electrical contactor wired in series between each respective heating element and thermostat, which contactor acts both as a temperature control and, with the contactors acting in series with each other, as a safety shut-off control.

These and other objects and advantages of the present invention are achieved in the preferred embodiment below by providing a heater block having a fluid inlet and a fluid outlet, the inner walls of the heater block defining a plurality of heating chambers interconnected to form a serpentine fluid flow path from the inlet to the outlet. A separate thermostat is positioned in the flow path for sensing the temperature of the fluid after passage through each heating chamber. The thermostat breaks, i.e. opens, a circuit when a given temperature is reached.

Electrical sequence switching means are provided and cooperate with the thermostats and the heating elements for interrupting electrical current to the heating element of each heating chamber having an open thermostat circuit and, in addition, interrupting electrical current to each heating element upstream in the flow path towards the fluid inlet.

Preferably, the electrical sequence switching means include an electrical contactor wired in series between a heating element and respective thermostat. The contactor is also wired in series with each contactor upstream toward the inlet for sequentially shutting off its own heating element and each upstream heating element.

A flow switch is positioned in the fluid flow path and deactivates the water heater in response to any fluid flow at less than a pre-determined minimum rate.

Also according to the preferred embodiment of the invention described below, the thermostats comprise disk-type bimetallic thermostats.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
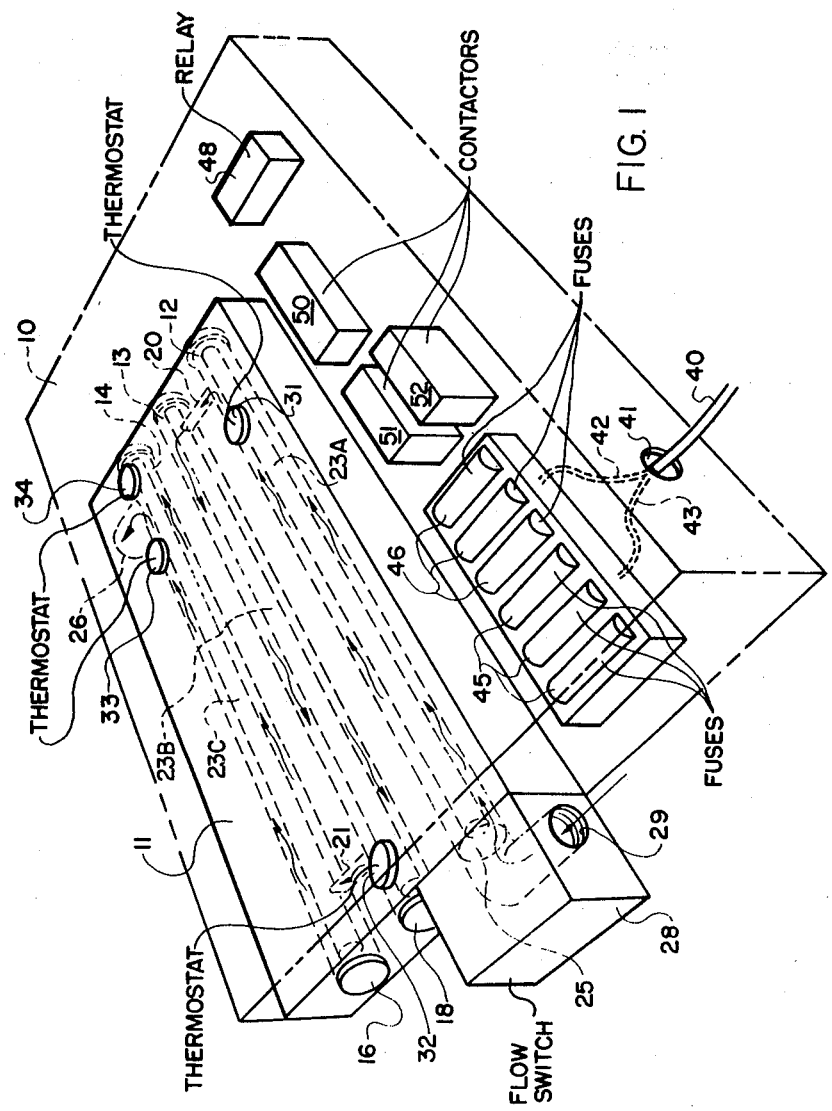
FIG. 1 is a schematic view of a preferred embodiment of the present invention showing the placement of components and the fluid flow path; and, FIG. 2 is an electrical circuit diagram of a preferred embodiment of the present invention.

Referring now specifically to the drawings, a preferred embodiment of the instantaneous water heater according to the present invention is shown schematically in FIG. 1. The unit is housed in a rectangular metal cabinet 10 and is intended to be mounted in upright position on a vertical surface. A heater block 11 is mounted within cabinet 10 and is preferably formed of a solid block of aluminum because of its relatively light weight, low cost, heat conductivity, and ease in machining. Three heating chambers 12, 13 and 14 are drilled into heater block 11. Heating chambers 12, 13 and 14 initially comprise through bores in heater block 11. Chambers 14 and 13 are closed on their respective bottom ends by screw plugs 16 and 18. Cabinet 10 is mounted vertically so that plugs 16 and 18 face downwardly and can be removed when desired to inspect the heating chambers or to clean trash or debris therefrom.

Heating chambers 12, 13 and 14 are interconnected by means of laterally extending passages 20 and 21. Electric resistance heating elements 23a, 23b and 23c are positioned in heating chambers 12, 13 and 14, respectively. Heating elements 23a-c are preferably a sheath-type "calrod" unit such as manufactured by Camco Manufacturing and according to the particular demands of the unit have a 4.5 to 5.5 kilowatt, 240 volt capacity.

The bottom opening of heating chamber 12 defines a fluid inlet 25, and a lateral passageway 26 connects the top of heating chamber 12 with the surface of heater block 11, thereby defining a fluid outlet.

A flow switch 28, preferably a 240 volt, type FS-62989 manufactured by Transamerica Delaval, Inc. is mated in fluid flow relation to fluid inlet 25. Flow switch 28 responds to a pre-determined minimum rate of fluid flow to activate the electrical system of heater 10, and to deactivate heater 10 whenever the fluid flow rate falls below the minimum. Flow switch 28 has a fluid inlet 29 to which is coupled a standard water supply pipe.

According to the description above, a serpentine fluid flow path is defined by entrance of the water into flow switch 28 through flow switch inlet 29 and into heating chamber 12 through inlet 25. Water flows along the length of heating chamber 12 from bottom to top and then laterally through passageway 20 into heating chamber 13. Water flows downwardly along heating chamber 13 and into passageway 20, and then along the length of heating chamber 14 from bottom to top, and thence out of the heater block 11 through outlet 26. The serpentine flow path provides for a relatively long interval of contact between heating elements 23a–c and the water within a relatively small space. As the serpentine design of the flow path results in relatively even heating of the heater block 11 itself.

In the system illustrated in FIG. 1, a thermostat 31 is positioned into the top of heating chamber 12 and directly senses the temperature of the water after it has passed along the length of the heating element 23a in heating chamber 12 and is ready to pass through passageway 20 into heating chamber 13. As will be described in further detail below, this thermostat is preferably a disk-type bimetallic thermostat having an open circuit temperature of 125° F. and a close circuit temperature of 113° F.

A thermostat 32 identical to thermostat 31 is positioned in the bottom end of heating chamber 13 and senses the temperature of the water after it has flowed the length of heating chamber 13 and is about to pass through passageway 21 into heating chamber 14. Positioned at the top end of heating chamber 14 adjacent outlet 26 are two thermostats 33 and 34. Both thermostats sense the temperature of water after it has passed along the length of heating chamber 14 from bottom to top and just prior to its exit through outlet 26. Both thermostats 33 and 34 are also disk-type bimetallic thermostats and are set to the maximum permitted system temperature. In this embodiment, the maximum temperature is 145° F. Hence, both thermostats are set to open the circuit at this temperature and close it at 128° F.

Also schematically shown in FIG. 1 is a 240 volt electrical supply cable 40 which passes through an aperture 41 in cabinet 10 and is split into two 120 volt electric lines 42 and 43 which supply parallel banks of 30 amp fuses 45 and 46. Also positioned within the housing is a relay 48, such as a Potter and Brumfield type KUP15A, 240 volt, 3 amp fan relay. Also positioned within cabinet 10 are contactors 50, 51 and 52. The contactors are preferably identical and are two-pole, 240 volt coil contactors having a 600 volt, 30 amp rating, and are manufactured by Furnas Electric Company (type 45CA20AG).

Figure 2:
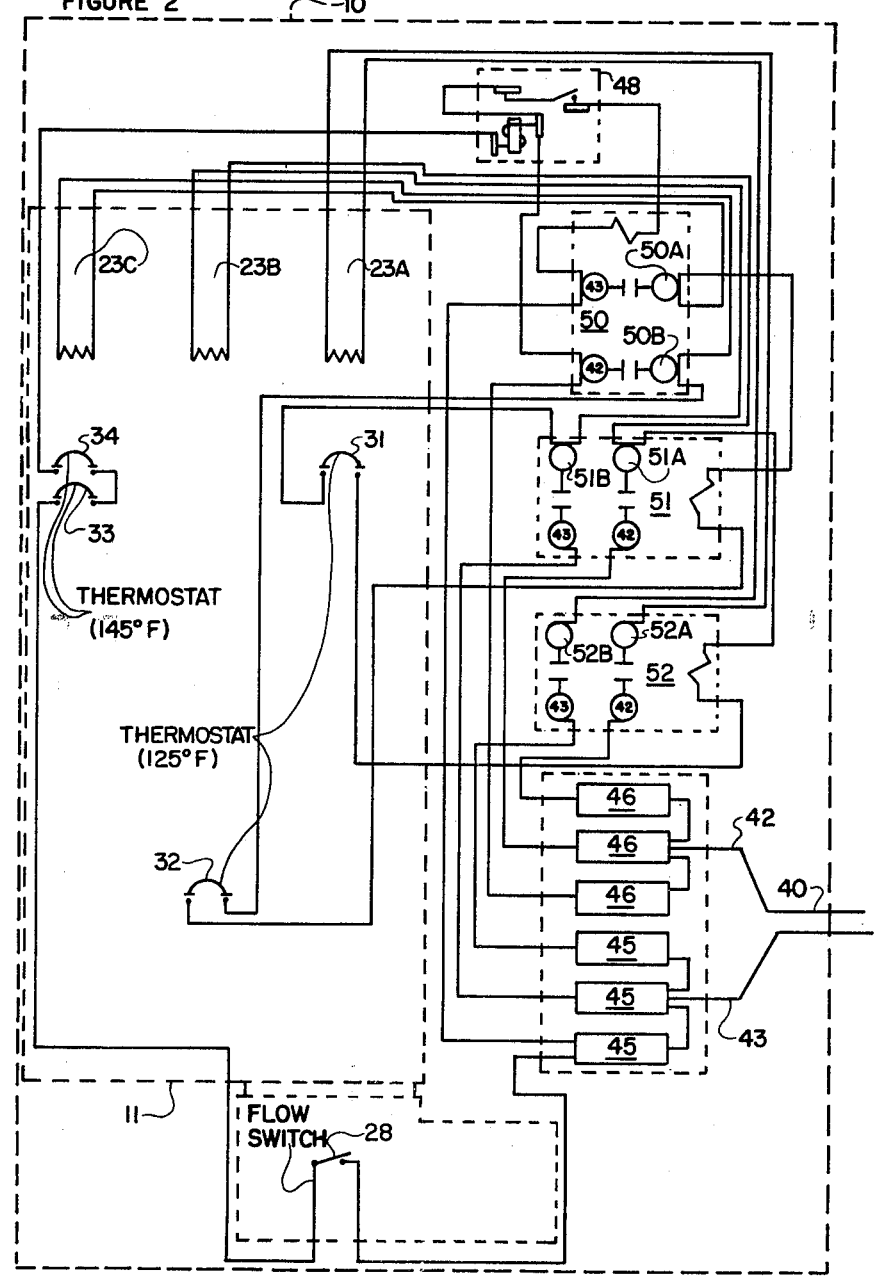

Referring now to FIG. 2, switch 28 is wired to electric lead 43. The water heater is cut on by means of relay 48 which activates when the water flow through switch 28 reaches a pre-determined minimum flow rate of 0.25 gallons per minute. Flow switch 28 is wired to relay 48 through thermostats 33 and 34. Thermostats 33 and 34 are wired in series. If either thermostat is open, either because of the normal functioning of the thermostats or because of some mechanical blockage, relay 41 cannot receive current and hence cannot cut on the heater. Since thermostats 33 and 34 are wired in series, both thermostats must be operating properly in order for relay 48 to receive current. Relay 48 is a normally-open relay type with an armature which, when energized, closes relay 48. Current flows from relay 48 to contactor 50. Contactor 50, as well as contactors 51 and 52, are wired to both incoming electric lines 42 and 43. Therefore, each contactor 50, 51 and 52 has its incoming leads appropriately numbered with either "42" or "43" to designate the incoming line to which it is connected.

Current from relay 48 activates contactor 50. Poles 50a and 50b direct current to heating element 23c. Contactor 50 is also wired from pole 50a with contactor 51, which it activates in sequence. Contactor 51 is wired to direct current through poles 51a and 51b to heating element 23b and also to activate contactor 52. Contactor 52 activates heating element 23a through poles 52a and 52b. 240 volt line 40 is split so that lines 42 and 43 are each 120 volts. Each line 42 and 43 passes through its own fuse bank 45 and 46, respectively. Fuses, which preferably have a 30 amp rating, control each line independently. If any of the fuses 45 or 46 blow, the entire system is shut down in sequence through contactors 50, 51 and 52.

Operation of the system will now be summarized. When water enters the flow switch inlet 29 at a greater than minimum, pre-determined rate, flow switch 28 activates relay 48 through series thermostats 33 and 34. As stated above, thermostats 33 and 34 are set at the maximum heater temperature which, in the instant case, is 145° F. Relay 48 activates contactor 50, which in turn directs current to heating element 23c in heating chamber 14 and simultaneously directs current to contactor 51. Contactor 51 directs current to heating element 23b in heating chamber 13 and to contactor 52. Contactor 52, being the last in series, activates heating element 23a in heating chamber 12.

Through testing it has been ascertained that each heating element 23 raises the temperature of the water by 25° F. at a flow rate of approximately six gallons per minute. Assuming an incoming water temperature in summer of approximately 55°–65° F., a 75° F. increase in temperature will occur to a temperature of 140° F. which is the desired system temperature. Assuming a winter water temperature of 40° F., the water will be increased in temperature to 115° F. Therefore, at this flow rate heating elements 23 will remain on constantly, heating the water to a suitable temperature.

Ordinarily, thermostat 31 never opens, since an addition of only 25° to the water temperature would mean that the incoming temperature of the water would need to be 100° F., an extremely unlikely occurrence. However, at a reduced flow rate the 125° F. temperature can be reached at thermostat 32 since 50° of heat has been added to the water by this point. If thermostat 32 opens, current to contactor 51 is interrupted. Since contactor 51 is wired in series between thermostat 32 and heating element 23b in heating chamber 13, this heating element is deactivated. In addition, since contactors 51 and 52 are wired in series with each other, contactor 52 is also deactivated by contactor 51. Contactor 52 controls heating chamber 12. Therefore, heating element 23c in heating chamber 12 is also deactivated. Therefore, water is being heated only in heating chamber 14. However, the decrease in water temperature is very gradual since heater block 11 itself is giving up heat to the water flowing therethrough. Depending upon the flow rate of the water, approximately 30–45 seconds would elapse before the water decreased in temperature to the thermostat closing temperature of 113° F. This temperature will normally be reached first at thermostat 31. However, since contactor 52 is wired in series behind contactor 51, heating element 23a and heating chamber 12 will not come on, even though thermostat 31 has closed. As soon as the temperature reaches 113° at thermostat 32, it closes, and the circuit between contactor 50, which remained open, and contactor 51 is re-established. Contactor 51 reactivates heating element 23b in heating chamber 13 and also activates contactor 52 which in turn reactivates heating element 23a in heating chamber 12. Heating element 23c in heating chamber 14 continues heating the water since contactor 50 is wired directly through relay 48 and is therefore controlled only by flow switch 28 or thermostats 33 and 34. Should the water temperature at either thermostat 33 or 34 reach 145° F., electric current to relay 48 is interrupted. This immediately shuts down the entire system, in sequence, as described above. Relay 48 does not know whether its current is interrupted by thermostats 33 or 34, or flow switch 28. Therefore, the heater is completely shut off whether the rise in temperature is caused by a decrease in water flow, or malfunctioning of one of the thermostats 33 or 34. The sequential arrangement of contactors 50, 51 and 52 guards against a malfunction in flow switch 28 which might permit water at less than minimum rate to flow through the system.

If the flow switch 28 should malfunction in the closed position, the water will quickly heat to the maximum temperature, causing the entire system to shut down.

An instantaneous water heater is described above. Various details of the invention may be changed without departing from its scope. Furthermore, the foregoing description of a preferred embodiment according to the present invention is provided for the purpose of illustration only and not for the purpose of limitation—the invention being defined by the claims.

I claim:

1. An instantaneous fluid heater having combined safety shut-off and temperature regulator and comprising:
   (a) a hollow heater block having a fluid inlet and fluid outlet, inner walls in said heater block defining a plurality of heating chambers interconnected to form a serpentine fluid flow path from the inlet to the outlet;
   (b) a separate electric heating element positioned in each heating chamber;
   (c) a separate thermostat positioned at the downstream end of each chamber in said flow path for sensing the temperature of fluid after passage through each heating chamber for opening an electrical circuit when a pre-determined high temperature is reached and closing an electrical circuit when a pre-determined low temperature is reached; and,
   (d) electrical sequence switching means cooperating with said thermostats and said heating elements to sequentially energize the heating elements located in said chambers, beginning with the heating element in the most downstream chamber, and said thermostats being arranged in circuit with said heating elements and said electrical sequence switching means to deenergize the heating element in the respective chamber with which the thermostat is associated upon attainment of a pre-determined temperature at the downstream end of the chamber and for deenergizing the heating element in each chamber upstream therefrom without regard to whether or not the thermostat associated with said upstream chamber is open or closed.

2. An instantaneous fluid heater according to claim 1 wherein said electrical sequence switching means comprises:
   an electrical contactor wired in series between each heating element and its respective thermostat, and in series with each contactor upstream toward the inlet for simultaneously shutting off its own heating element and each heating element upstream therefrom upon opening of the thermostat to break the series circuit between the heating element and contactor.

3. An instantaneous fluid heater according to claim 2 and including a flow switch positioned in the flow path of the fluid and electrically connected to the one of said contactors controlling the heating element furthest downstream in the flow path towards the outlet, for activating said heating elements in sequence through said electrical sequence switching means in response to a pre-determined minimum rate of fluid flow, and deactivating said heating elements in sequence through said electrical sequence switching means in response to any fluid flow at a rate less than the pre-determined minimum rate.

4. An instantaneous fluid heater according to claim 3 wherein said flow switch is electrically connected to said one contactor through a normally open electrical relay.

5. An instantaneous fluid heater according to claim 3 wherein said heating element furthest downstream in said flow path is controlled by a thermostat set to a pre-determined maximum permitted fluid temperature and the other heating elements upstream therefrom are controlled by thermostats set to temperatures less than the maximum permitted fluid temperature, whereby all heating elements are always shut off whenever the maximum permitted fluid temperature is reached within the fluid heater.

6. An instantaneous fluid heater according to claim 5, wherein at least two thermostats are provided for controlling the heating element furthest downstream in the flow path, said thermostats being wired in series and both being set to the pre-determined maximum permitted fluid temperature, whereby said heating elements are shut off even though one of said thermostats should malfunction.

7. An apparatus according to claim 5, wherein said thermostat set to the maximum permitted fluid temperature and controlling the heating element furthest downstream in said flow path is wired in series between said flow switch and said heating element.

8. An instantaneous fluid heater according to claim 1 wherein each of said heating elements comprises a sheathed electrical resistance element.

9. An instantaneous fluid heater according to claim 1 wherein said thermostats each comprise a disk-type bimetallic thermostat.

* * * * *